July 23, 1929.  E. G. NELSON, JR  1,721,968

PNEUMATIC GLASS CIRCULATOR

Filed Aug. 3, 1926

INVENTOR
ERNEST G. NELSON JR.
BY Robson & Brown
Attorney

Patented July 23, 1929.

1,721,968

UNITED STATES PATENT OFFICE.

ERNEST G. NELSON, JR., OF HARTFORD, CONNECTICUT, ASSIGNOR TO HARTFORD-EMPIRE COMPANY, OF HARTFORD, CONNECTICUT, A CORPORATION OF DELAWARE.

PNEUMATIC GLASS CIRCULATOR.

Application filed August 3, 1926. Serial No. 126,802.

My invention relates to a method and apparatus for feeding mold charges of molten glass by gathering from the surface of a body of molten glass contained in a gathering pool or forehearth. It is particularly adapted for use in connection with glass gathering devices employing a gathering receptacle, such as a transfer cup or mold, which is filled by suction from the surface of a pool.

When a mold charge of molten glass is gathered by a suction gatherer, or similar means, from a pool of glass, the surface of the glass at the gathering station is chilled by contact with the relatively cold gathering means and with such shearing means as are employed to sever the mold charge from the body of glass in the pool. The surface of the glass at the gathering station is also chilled by the exposure caused by the opening which is needed for entrance of the gathering means. These chilled portions of glass would ordinarily be gathered up by the gathering means in gathering subsequent charges, causing defects or blemishes in the charge, which would appear as defects in ware made therefrom. The chill would also interfere with subsequent gathering operations and might even prevent gathering.

My invention has for its object the removal of the chilled surface of glass from the gathering station and the replacing of such chilled glass with hot glass, by causing a circulation or movement of glass, and particularly of the surface glass, past the gathering station, in a gathering pool or forehearth of proper proportion and with proper temperature regulating means. A further object is the reheating of the chilled glass by subjecting it to a suitable environment.

Still another object is to provide a suitable gathering pool or forehearth from which mold charges may be gathered. These and other objects will be apparent from the following description.

Figure 1:
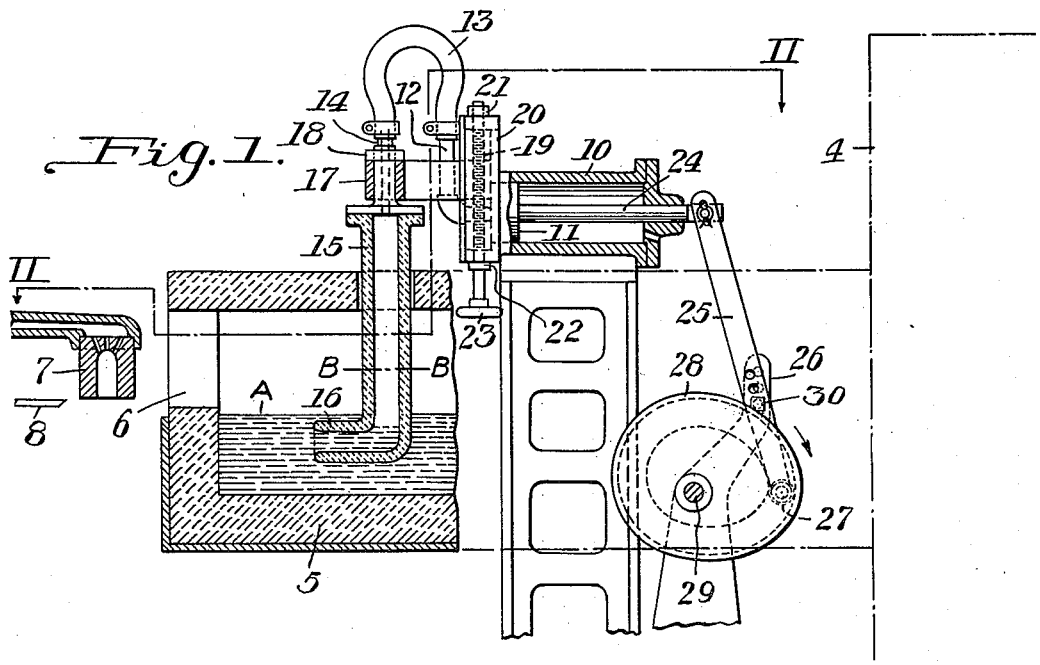
Figure 2:
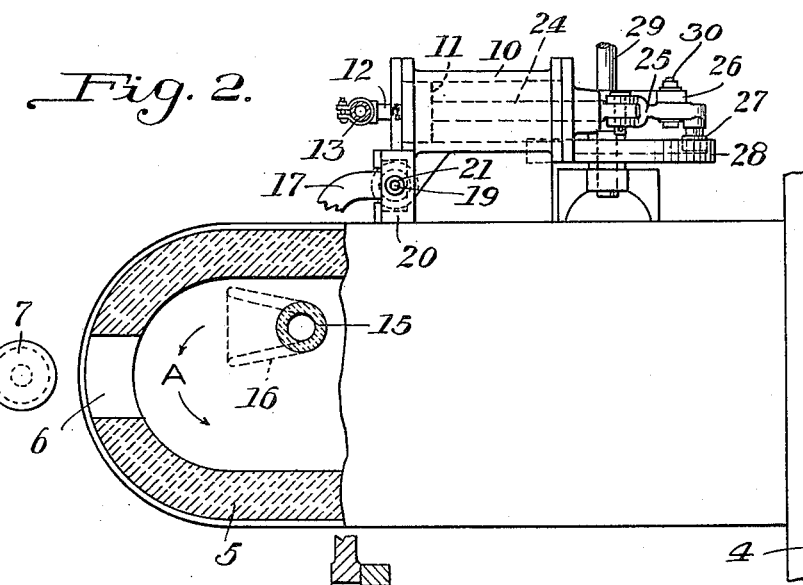
Figure 3:
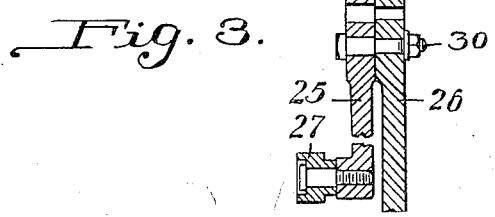

One manner in which my invention may be practised is shown in the accompanying drawings, wherein Figure 1 is a view, partially in side elevation and partially in section, of apparatus for imparting impelling movements to a body of molten glass, a portion of the forehearth being broken away; Fig. 2 is a view taken on the line II—II of Fig. 1, and Fig. 3 is a vertical sectional view of a portion of the apparatus of Fig. 1.

In Fig. 2, I have shown a portion of a glass melting furnace 4, which is provided with a forehearth 5 of substantially the usual form. The forehearth is provided with an opening 6 through which a suction cup 7 is periodically inserted to take up charges of molten glass. A shear 8 is inserted through the opening 6 to sever the gather or charge of glass from the body of molten glass within the forehearth, the suction cup then being removed from the forehearth and caused to deliver the gather to a mold.

As a motive force for causing circulation or flow of molten glass past the gathering point A, I employ fluid pressure such as air, preferably intermittently applied to the body of glass. In order to provide the desired fluid pressure, I employ a cylinder 10 and a piston 11. An outlet pipe 12 communicates with the cylinder 10 and is connected to a flexible pipe 13. The pipe 13 is also connected to a hollow stem or pipe 14 that communicates with a tube 15 which is of refractory material. The lower end of the tube 15 may have a forwardly extending flared portion 16, so that an impelling force may be imparted to the body of glass within the forehearth, over a wide area.

The distance which the tube 15 extends into the forehearth may be regulated by means of a vertically adjustable bracket arm 17 upon one end of which a collar 18 that is fixedly connected to the upper end of the tube 15 is supported. The other end of the arm 17 is screw-threaded, for engagement with an adjusting screw 19 that is rotatably supported in a bracket 20 the screw being held against vertical movement by means of collars 21 and 22. Upon rotation of the handwheel 23 that is secured to the screw 19, the tube 15 will be moved vertically.

The piston 11 is connected to a rod 24 that has pin-and-slot connection with a lever 25. The lever 25 is pivotally connected to a bracket 26, at a point intermediate its ends and, at its lower end, carries a cam roller 27 which extends into a cam slot in a cam disc 28. The cam slot is disposed eccentrically of the shaft 29, so that as the disc 28 is rotated, the lever 25 will be oscillated about its pivot and thereby effect reciprocating movements of the piston 11, and set up a flow of air back and forth through the tube 15. The length of stroke of the piston 11, and hence the volume of air displaced thereby, is regulated by shifting the position of a pin or bolt 30 that serves as the pivot for the lever 25, from one pair of holes in the lever 25 and bracket 26, respectively, to another pair. This change in the point of pivotal support for the lever 25 will also result in variation of speed at which the piston 11 moves, thereby provided impulses of air at various degrees of intensity.

In the position shown in Fig. 1, the piston 11 is at its extreme left hand or advanced position. The slot in the cam disc 28 is of such shape that the retractive movement of the piston is slow, and there will not be an abrupt suction force set up within the tube 15, while the forward movement of the piston is relatively rapid, so that a proper impelling force will be imparted to the molten glass to effect movement thereof in the direction indicated by the arrows in Fig. 2.

The length of stroke of the piston is so regulated that no air will be forced from the outlet of the tube, thus avoiding the formation of air bubbles within the body of the glass. This arrangement is possible because the lower end of the tube is immersed in the glass and the piston 11 on its return stroke will draw the glass into the tube to the height indicated by the line B—B for example and only a volume of glass equal to that between the line B—B and the horizontal portion 16 of the tube is displaced by the forward movement of the piston 11. Since the piston is retracted more slowly than it is advanced, the propelling force imparted to the body of glass at the station A will be greater than the retractive force imparted thereto.

It will be understood that any other suitable means may be employed for imparting pressure and vacuum forces within the tube 15, and fluids other than air may be employed.

Various advantages in the use of fluid-pressure for imparting circulatory movement to the glass, as opposed to the use of paddles, stirring devices, etc. will be apparent to those skilled in the art.

I claim as my invention:

1. The method of effecting circulation of molten glass, which comprises imparting movement thereto by fluid pressure, and directing the flow of glass in a horizontally curved path.

2. The method of feeding molten glass, which comprises withdrawing charges of glass from the forward portion of a pool, and imparting forward movement to the glass by means of fluid pressure exerted in a direction longitudinally of the pool.

3. The method of feeding molten glass, which comprises withdrawing charges of glass from the forward portion of a pool, imparting forward movement to the glass by means of fluid pressure exerted in a direction longitudinally of the pool, and directing a portion of the glass so advanced to a rear point in the pool.

4. The method of feeding molten glass, which comprises withdrawing charges of glass from the forward portion of a pool, imparting forward movement to the glass by means of fluid pressure exerted in a direction longitudinally of the pool, directing a portion of the glass so advanced to a rear point in the pool, and again advancing the glass which has been directed rearwardly.

5. The method of feeding molten glass, which comprises withdrawing charges of glass from the forward portion of a pool, subjecting a portion of the glass at the forward end of the pool to fluid pressure and vacuum, alternately, said pressure being applied more rapidly to the glass than the vacuum.

6. The method of effecting circulation of molten glass, which comprises subjecting the same to fluid pressure to cause circulatory movement thereof in the direction in which it is desired that the glass shall move.

7. The method of effecting circulation of molten glass, which comprises intermittently subjecting the same to fluid pressure to cause circulatory movement thereof in the direction in which it is desired that the glass shall move.

8. Apparatus for effecting circulation of molten glass, comprising means for confining a body of molten glass, a conduit having its outlet extending into the glass of the body in the direction in which it is desired that the glass shall move, and means for supplying fluid pressure through said conduit to cause circulatory movement of glass of said body.

9. Apparatus for effecting circulation of molten glass, comprising means for confining a body of molten glass, a conduit having its outlet extending into the body of glass, and means for supplying fluid pressure to said conduit to cause circulatory movement of glass of said body.

10. Apparatus for effecting circulation of molten glass, comprising means for confining a body of molten glass, a conduit having its outlet extending into the body of glass, and means for alternately supplying fluid pressure to said conduit and subjecting the same to vacuum to effect circulation of glass of said body.

11. Apparatus for effecting circulation of molten glass, comprising means for confining a body of molten glass, a conduit having its outlet extending into the body of glass, and means for alternately supplying fluid pressure to said conduit and subjecting the same to vacuum, the retractive action of the vacuum force on glass in said body being less than the propelling action of the fluid pressure on glass in said body.

12. Apparatus for effecting circulation of molten glass, comprising a vertically disposed conduit that is provided with a horizontally disposed outlet which is normally immersed in the glass, and means for supplying fluid pressure to said conduit.

13. Apparatus for effecting circulation of molten glass, comprising a vertically disposed conduit provided with a horizontally disposed outlet that is normally immersed in the glass, and means for alternately supplying fluid pressure to said conduit and subjecting the same to vacuum.

14. Apparatus for effecting circulation of molten glass, comprising a conduit having an outlet for immersion in the glass, a cylinder communicating with the inlet end of said conduit, a piston in the cylinder, and means for reciprocating said piston at a higher speed for one of its strokes than for its return stroke.

15. Apparatus for effecting circulation of molten glass, comprising a conduit having an outlet for immersion in the glass, a cylinder communicating with the inlet end of said conduit, a piston in the cylinder, a lever connected to said piston and pivotally supported intermediate its ends, and an actuating member engaging the other end of said lever to effect oscillation thereof at a higher speed during one of the strokes of the lever than during its other stroke.

16. Apparatus for effecting circulation of molten glass, comprising a conduit having an outlet for immersion in the glass, a cylinder communicating with the inlet end of said conduit, a piston in the cylinder, a lever connected to said piston and pivotally supported intermediate its ends, and an actuating member engaging the other end of said lever to effect oscillation thereof, the point of pivotal support of the lever being adjustable longitudinally of the lever.

17. Apparatus for effecting circulation of molten glass, comprising a conduit having a laterally turned outlet extending into the glass and terminating adjacent to, but beneath the surface of the glass, and means for intermittently supplying fluid to the conduit, under pressure, the volume of fluid so supplied being smaller than the volume of glass normally present in said outlet.

18. The method of feeding molten glass, which comprises periodically gathering portions of glass from the surface of a pool of molten glass, and periodically applying pneumatic impulses to the glass of the pool to cause movement of portions thereof past the gathering station.

19. The method of feeding molten glass, which comprises periodically gathering portions of glass from the surface of a pool of molten glass, and periodically applying pneumatic impulses to the glass of the pool to cause movement of portions thereof past the gathering station in the intervals between successive gathering operations.

20. The method of feeding molten glass, which comprises periodically gathering portions of glass from the surface of a confined pool of molten glass, and circulating surface glass of the pool past the gathering station by applying fluid impulses to the glass of the pool.

21. The method of feeding molten glass, which comprises periodically gathering portions of glass from the surface of a confined pool, periodically applying fluid pressure to the glass of the pool to move portions thereof past the gathering station, and relieving the fluid pressure on the glass after each application thereof.

22. The method of treating molten glass of a supply body from which portions are withdrawn periodically for mold charges, which comprises applying a fluid impulse to the glass of the supply body to move a portion thereof past the point of withdrawal in a plane substantially at right angles with the direction of withdrawal of said mold charge-forming portions.

23. The method of treating molten glass of a supply body from the surface of which portions are gathered periodically to form mold charges, which comprises applying fluid impulses to a portion of the glass of the supply body to effect movement of portions thereof at the surface of the supply body past the gathering point.

24. The method of treating molten glass of a confined body of molten glass from the surface of which mold charges are withdrawn periodically, which comprises partially sequestering a portion of the glass body adjacent to the surface thereof, and periodically imparting motion to said partially sequestered portion to cause movement of glass of the supply body at the place of withdrawal of mold charges.

25. Apparatus for effecting circulation of molten glass of a pool, comprising a tubular conduit dipping into the glass and having a laterally turned outlet adjacent to but below the surface of the glass, means for periodically applying fluid pressure to the glass in the outlet end of the conduit, and means for relieving said fluid pressure after each application thereof.

26. Apparatus for effecting circulation of molten glass of a pool, comprising a tubular conduit dipping into the glass and having a laterally turned horizontally flared outlet end submerged in the glass adjacent to the surface thereof, and means for applying a fluid pressure impulse to the glass in the outlet end of the conduit to cause horizontal movement of glass of the pool.

Signed at Hartford, Conn., this 2nd day of August, 1926.

ERNEST G. NELSON, Jr.